United States Patent Office 3,830,834
Patented Aug. 20, 1974

3,830,834
PROCESS FOR THE CONTINUOUS PREPARATION OF VINYL ACETATE
Walter Kronig, Wiesbaden; Gunter Roscher, Kelkheim; Wulf Schwerdtel, Cologne, and Kurt Sennewald, Huerth-Mitte, Germany, assignors to Bayer Aktiengesellschaft and Farbwerke Hoechst Aktiengesellschaft vormals Meister Lucius & Bruning, Frankfurt am Main Hoechst, Germany
No Drawing. Continuation-in-part of abandoned application Ser. No. 682,564, Nov. 13, 1967. This application Aug. 11, 1971, Ser. No. 170,967
Claims priority, application Germany, Nov. 12, 1966, K 60,705; Dec. 27, 1966, F 51,091
Int. Cl. C07c 67/04
U.S. Cl. 260—497 A
23 Claims

ABSTRACT OF THE DISCLOSURE

The activity and selectivity of catalysts comprising palladium metal and an alkali metal acetate, when used for the production of vinyl acetate from ethylene, oxygen and acetic acid, is maintained at a high level even after prolonged long term continuous use, by the continuous addition of quantities of alkali metal acetate to a reactant stream or the reaction space.

---

This application is a continuation-in-part of S.N. 682,564 filed Nov. 13, 1967, and now abandoned.

The present invention relates to a new and efficient catalytic process for the preparation of vinyl acetate and, more particularly, to a process which permits long-term continuous production of vinyl acetate.

It is known from U.S. Pat. 3,275,680 that vinyl acetate can be prepared by reacting ethylene with acetic acid and oxygen at elevated temperatures in the presence of catalysts containing palladium metal and, advantageously, an alkali metal acetate. British Pat. 1,017,938 discloses for the preparation of vinyl acetate in a gas-phase process the use of a palladium catalyst which is pretreated with alkali metal acetate. In British Pat. 1,103,725 the production of vinyl acetate is described using a catalyst as disclosed in U.S. Pat. 3,275,680 which additionally contains gold metal. These processes yield vinyl acetate in good yield and, initially, with satisfactory space-time yields, but it has been found that the space-time yield in this process does drop over time and that the selectivity of the process to form vinyl acetate, as opposed to undesired by-products, also decreases over time.

Many attempts have been made in the art to solve this problem of diminishing yields and decreasing selectivity because, in commercial and practical operation, it is essential to maintain high catalytic activity and selectivity over very extended periods of time of e.g., up to a year and more.

The art, e.g., U.S. Pat. 3,480,558, ascribed this loss of catalyst activity experienced in prior art processes to factors such as lack of catalyst "stability." This problem was sought to be solved by regenerating the catalyst after relatively short periods of use. However, the regenerating techniques disclosed in the art are cumbersome, multistep methods which have not been found to be satisfactory. In addition, of course, the process must be interrupted to remove and regenerate the catalyst. Other factors that have been suggested as leading to loss of catalyst activity are a gradual poisoning of the catalyst due to an acumulation of by-products and/or inerts in the reaction system. It was thought that deposits formed on the catalyst or a coating of the catalyst gradually took place thereby diminishing the activity of the catalyst. However, it was subsequently discovered that methods that eliminated or mitigated the accumulation of such foreign material did not result in maintaining catalyst activity and selectivity. This inability of the prior art to overcome the deficiencies of the known process thus indicated that foreign matter accumulation was not the real or determining factor in causing loss of catalyst life. Prior to the instant invention, no satisfactory way had been found to maintain catalyst activity at a very high level over prolonged periods when making vinyl acetate from ethylene, oxygen and acetic acid.

It has now been surprisingly found that catalyst activity and selectivity of a catalyst comprising palladium metal and alkali metal acetate in processes for making vinyl acetate, may be maintained at a very high level for very prolonged periods of operation of the process, e.g., for periods of up to one year or more.

Essentially, the process of this invention comprises continuously introducing to a reactant stream or to the reaction space in which vinyl acetate is formed amounts of alkali metal acetate, or of a compound that forms an alkali metal acetate under the reaction conditions. The amount of alkali metal acetate or compounds so introduced is preferably such as to substantially saturate the reactant stream or the reaction space with gaseous alkali metal acetate or compound. Conveniently, the alkali metal acetate so introduced is the same as the alkali metal acetate used as a catalyst component.

The amount of alkali metal acetate so introduced depends on the specific reaction system and reaction conditions used but will generally be in the range of 2 to 200 parts per million, and preferably from 5 to 50 parts per million, based on the amount of acetic acid introduced into the reactor. The amount is preferably such that the reaction system or reactant stream into which the acetate is introduced is substantially loaded with alkali metal acetate, i.e., wherein the stream or space holds substantially as much acetate as it can possibly hold. Thus, amounts corresponding to e.g., 80 to 100% of the saturation value which the alkali metal acetate in the reactor space has are desirably used. While these amounts of alkali metal acetate or compound introduced are not large in an absolute sense they dramatically and surprisingly alter and improve the efficiency and life-span of continuous processes for making vinyl acetate.

The term "alkali metal compounds which form alkali metal acetate" is here understood to mean any compound which is capable of forming alkali metal acetates under the reaction conditions; e.g., there can be mentioned alkali metal hydroxides, alkali metal carbonates, alkali metal boronates, alkali metal phosphates and alkali metal carboxylates. Such compounds are capable of forming alkali metal acetate in situ, in the presence of the acetic acid reactant, in the reaction system, when operating the vinyl acetate process as taught by the art, i.e., at from about 50 to 250° C. and at, e.g., normal to 200 atmospheres pressure (see U.S. Pat. 3,275,680, which generically discloses the process for making vinyl acetate to which the instant invention is applicable).

The alkali metal acetate or compound may be added or introduced to the reactants in various manner: the alkali metal acetate or compound may, for example, be dissolved in the acetic acid reactant, e.g., dissolved in the fresh acetic feed. Preferably, however, the alkali metal compound or acetate is introduced into a reactant stream containing at least ethylene and acetic acid at a temperature where said ethylene and acetic acid are entirely in the gas phase. Preferably, the alkali metal acetate or alkali metal compound is introduced into the reactant gas stream containing primarily ethylene and acetic acid at conditions of temperature and pressure being approximately similar to the conditions of temperature and pressure in the reactor. It has, in one surprising aspect of the invention, been found that an alkali metal acetate may be introduced in entirely *gaseous* form when introducing it into an ethylene/acetic acid gas mixture at temperatures above about 120° C. at normal or elevated pressure. This effect is most surprising because alkali metal acetate, and other alkali metal salts contemplated for use in this invention, are salts which would not be expected to volatilize under the conditions in which they are used in the instant invention.

The surprising volatilization of alkali metal acetate when introduced into a gas mixture containing ethylene and acetic acid does not occur when it is attempted to volatilize such acetate in an ethylene stream containing no acetic acid (see Example 8, infra).

When so introducing the alkali metal acetate or compound to a reactant stream in the gas phase the alkali metal acetate or compound may be dissolved in a suitable solvent, for example, acetic acid or water, and the resulting solution can be introduced, e.g., sprayed, into the stream of hot gas which ultimately enters the reactor. Both the solvent and solute, i.e., the alkali metal acetate or compound, completely evaporate and exist totally in the gas phase in the hot gas reactant stream.

In another embodiment, the heated gaseous reactants may be conducted partly or entirely at elevated temperature through a solution of the alkali metal salts, the hot gases carrying the alkali metal salts with them and introducing them into the reaction chamber.

Furthermore, the alkali metal salts may be introduced into the reactants by passing the reactants partly or entirely in the gaseous form at elevated temperature through an alkali metal cartridge, e.g., a layer of solid bodies which are impregnated with the alkali metal salts. Suitable solid bodies include, for example, porous materials which are not attacked by the reactants under the operating conditions. Silicic acid, for example, may be used as a carrier. The concentration of alkali metal compounds in the carriers may be about 1% to 20% by weight. The stream of gas may be passed upwards, or downwards, or horizontally through the layer of solid material. The temperature in the layer of solid material is preferably chosen to be near the reaction temperature, but may, if desired, be slightly above or slightly below this. The apparatus containing the solid bodies is also kept at the same pressure as the reaction chamber. If the solid bodies have become impoverished in alkali metal salts after a certain period of operation, the process may be transferred to another assembly filled with freshly impregnated solid bodies. Alternatively, the alkali metal compounds may be supplied in solution continuously or intermittently to the layer of solid bodies, thereby maintaining the solid layer sufficiently charged with alkali metal salts.

With respect to the catalyst to which the instant invention is applicable, palladium, which may contain additions of metal such as gold as well as other noble metals of Group VIII of the Periodic System, such as iridium, ruthenium, platinum, rhodium and osmium, is especially suitable as a catalyst for the reaction. It is preferable to employ carrier catalysts. Suitable concentration of the noble metals on the carrier are from 0.05 to 5 grams, preferably from 0.1 to 2 grams, of the noble metals per 100 cc. of the catalyst charge. The additives to the palladium may be used in quantities of, for example, from 2 to 150 parts by weight of palladium. Porous materials which are not attacked by the reactants under the reaction conditions, are suitable for use as carriers for the noble metals. Examples of porous materials which are suitable for this purpose are silicic acid, silicates such as magnesium silicate and aluminum silicate, kieselguhr, annealed aluminum oxide, spindels, silicone carbide, aluminum phosphate, asbestos, pumice and active charcoal. The alkali metal salts are then applied to the carriers provided with the noble metals.

The carrier materials should generally have an active surface area between about 50 and 400 m.$^2$/g. The catalyst carrier used for preference is silicic acid which has an active surface area according to BET of, for example, 50 to 200 m.$^2$/g., e.g., 180 m.$^2$/g., and a bulk density of, for example, 0.5 kg./l.

The catalyst, which may, for example, be fixed in the reaction chamber, should contain from 0.1% to 10%, and preferably from 1% to 5% by weight (based on the catalyst carrier) of alkali metal salts. In principle, any alkali metals may be used; but lithium, sodium and potassium, and mixtures of these alkali metals are especially suitable. The alkali metals are generally introduced as acetates, but the alkali metals may also be applied in some other form to the catalyst, e.g., as hydroxides, carbonates, borates, phosphates and carboxylates.

The noble metals are preferably applied to the carriers in form of their salts and the salts are reduced with suitable agents to the metals, for example with hydrazine, sodium formate, hydrogen-containing gases, methanol vapors, ethylene, etc. The anions introduced with the noble metal salts can be removed for example by washing if necessary.

The reaction of ethylene with acetic acid and oxygen is carried out in the gaseous phase at elevated temperature, e.g., at temperatures between 50° C. and 350° C., preferably 100° C. to 250° C. The pressure employed may be normal pressure, slightly reduced or elevated pressure, e.g. up to about 200 atmospheres, preferably up to 20 atmospheres. The molar ratio of ethylene to oxygen may, for example, be between 80:20 to 98:2, and the molar ration of acetic acid to ethylene may be between 1:1 to 1:100. The hourly throughput of ethylene through 1 liter of reaction space is advantageously between 5 and 50 mols.

It has proved to be advantageous to subdivide the reaction chamber into several parallel tubes which are surrounded on the outside by a cooling liquid, preferably an evaporating liquid such as water.

The internal width of the tubes should be between 30 and 60 mm. and the length between 1 and 20 m.; it is advantageous to adjust the length so that the flow velocities obtained, based on the empty reaction chamber, are between 10 and 200 cm. per second.

The invention is further illustrated by the following examples without being restricted thereto.

EXAMPLE 1

(a) The reaction chamber, consisting of a pipe of 20 mm. internal width and 1500 mm. length surrounded by hot water, was filled with 1 liter of catalyst which contained 18 g. of palladium and 20 g. of sodium acetate on a lithium/aluminum spinel carrier. A mixture consisting of 9.10 gram mols of ethylene, 3.50 g. mols of acetic acid and 1.65 g. mols of oxygen was passed hourly in a downward stream at 140° C. and at atmospheric pressure over 1 liter of this catalyst. The reactants were then converted in the reaction chamber into vinyl acetate and water with the formation of small quantities of carbondioxide as a by-product. The Table given below shows the output of vinyl acetate based on grams of vinyl acetate per liter of reaction chamber and per hour, and the selectivity of formation of vinyl acetate in terms of the molar ration of vinyl acetate formed based on converted ethylene. The remainder to make up 100 consists mainly of carbon dioxide.

(b) In the comparison test, the same conditions were employed but 12 mg. of sodium acetate dissolved in 20 g. of acetic acid were sprayed every 6 hours into the reaction chamber onto the catalyst. The output and selectivity obtained are shown in Table 1. It will be seen that decrease of catalyst activity was prevented by the addition of sodium acetate.

TABLE 1

| Experimental time, days | Example 1(a) | | Example 1(b) | |
|---|---|---|---|---|
| | Vinyl acetate, g./l., h. | Selectivity (percent) | Vinyl acetate, g./l., h. | Selectivity (percent) |
| 10 | 117 | 92 | 116 | 93 |
| 20 | 104 | 90 | 115 | 92 |
| 30 | 84 | 86 | 114 | 91 |
| 40 | 50 | 83 | 111 | 90 |

EXAMPLE 2 (COMPARISON EXAMPLE WITHOUT ALKALI METAL ACETATE)

1 kg. of a silicic acid carrier in the form of spherical pellets of 4 mm. diameter was mixed and thoroughly impregnated with an aqueous solution containing 8 g. of Pd as PdCl$_2$ and 3 g. of Au as H[AuCl$_4$]. The mixture was then dried with stirring to achieve uniform distribution of the noble metal salts on the carrier, and the dry mass was slowly introduced into a 4–5% hydrazine hydrate solution at 40° C. After reduction of the noble metal compound was complete, the supernatant liquid was poured off, and the catalyst was thoroughly washed with distilled water and dried under vacuum at 60° C. The catalyst prepared in this way contains about 0.8% of Pd and 0.3% of Au and has a bulk density of 0.54 kg. per liter.

350 cc. of the catalyst mass were introduced into a tube of 18/8 chrome nickel steel of 25 mm. internal diameter inside which was a central tube of the same material of 14 mm. external diameter designed to contain thermocouples for the temperature measurement, and the catalyst was kept at 170° C. by tempering the tube. A gaseous mixture consisting of 100 N liters of ethylene, 70 N liters of air and 160 g. of acetic acid was passed hourly through the vertical tube at a pressure of 6 atmospheres. The condensable constituents were removed by condensation from the gaseous mixture leaving the reaction tube by cooling to −70° C., and analysed by distillation or gas chromatographic analysis. The volume/time yields were only 10 to 20 g. of vinyl acetate per liter of contact per hour.

EXAMPLE 3 (COMPARISON EXAMPLE WITH SODIUM ACETATE)

350 cc. of the catalyst prepared as in Example 2 were impregnated with 350 cc. of a 10% aqueous sodium acetate solution, the supernatant liquid was decanted, and the mixture was then dried under vacuum at 60° C. This catalyst contained 0.76% Pd, 0.28% Au and 1.5% Na as sodium acetate. Outputs of up to 94 g. of vinyl acetate per liter of catalyst per hour were obtained with this catalyst under same conditions as in Example 2. The catalyst output dropped to 46 g. of vinyl acetate per liter of catalyst per hour within 19 days. During this time, 1.1 g. of Na, or about 40% of the sodium acetate originally present, had migrated from the carrier catalyst while the average content in the condensate was 15 p.p.m. of Na. After removal of the catalyst, outputs of up to 70 g. of vinyl acetate per liter of catalyst per hour can be obtained by adjusting the sodium content to the original value simply by impregnating the catalyst with sodium acetate solution again.

EXAMPLE 4 (COMPARISON EXAMPLE WITH POTASSIUM ACETATE)

A catalyst prepared as in Example 2 was charged with 4.2% K by impregnating it with a 15% potassium acetate solution. Under the conditions indicated in Example 2, outputs of 140 g. of vinyl acetate per liter of catalyst per hour were obtained with this catalyst. After an operating time of 55 days, the catalyst output was still at 120 g. of vinyl acetate per liter of catalyst per hour. During this time, 1.5 g. of potassium in the form of the acetate had migrated from the catalyst with the condensate, corresponding to about 19% of the potassium acetate originally present. This clearly showed a substantial increase in catalyst life over that obtained in the experiment described in Example 3, owing to the reduced rate of migration of potassium acetate compared with sodium acetate.

EXAMPLE 5 (COMPARISON EXAMPLE WITH POTASSIUM ACETATE/CAESIUM ACETATE)

Using a catalyst which was similar except for containing 3% potassium and 2.5% caesium as acetates, outputs of 140 to 150 g. of vinyl acetate per liter of catalyst per hour were obtained under the reaction conditions of Example 2. No loss in output could be detected after an operating time of 40 days. During this time, 0.35 g. of caesium, corresponding to about 8% of the caesium originally present, and 1.23 g. of potassium (22% of the potassium originally present) were discharged as acetates with the reaction gases.

EXAMPLE 6 (ACCORDING TO THE INVENTION)

Under the reaction conditions of Example 2, a catalyst which contained 0.62% Pd, 0.25% Au, 1.4% Na and 2.5% K on silicic acid as a carrier reached a space-time yield after a development period of 135 g. of vinyl acetate per liter of catalyst per hour, which, in the course of a further 7 days, dropped to 120 g. of vinyl acetate per liter of catalyst per hour. Within this period, the alkali metal acetate contents in the condensate due to migration of the alkali metal acetate were at about 15 p.p.m. Na and about 7 p.p.m. K. The same quantity of alkali metal acetate (15 p.p.m. Na and 7 p.p.m. K) as found in the condensate was now supplied with the acetic acid to the acetic acid evaporator heated to 190° C. The space-time yield thereupon rises again to 130 g. of vinyl acetate per liter of catalyst per hour in the course of a further 14 days.

EXAMPLE 7 (ACCORDING TO THE INVENTION)

690 N liters of ethylene, 480 N liters of air and 1400 g. of acetic acid were conducted per hour under the conditions of Example 2 over 2.4 liters of a catalyst containing 0.7% Pd, 0.27% Au, 1.5% Na as CH$_3$COONa and 3.3% as CH$_3$COOK on silicic acid as a carrier. Space-time yields on an average of 135 to 140 g. of vinyl acetate per liter of catalyst per hour had become established on the second day and remained constant over a period of 45 days. After a further 10 days, the catalyst output dropped, owing to loss of alkali metal acetate from the catalyst, to 80 g. of vinyl acetate per liter of catalyst per hour. Up to that time, the entire sodium acetate and about 35% of the potassium acetate originally present on the catalyst had been discharged with the reaction gases. A cartridge of 100 g. of catalyst carrier (silicic acid) containing 2.7% Na and 4.9% K in the form of the acetates was now installed in the stream of starting gases in front of the reactor to replenish the catalyst with alkali metal acetates and both cartridge and reaction tube were heated to 170° C. About 95% of the sodium acetate and 70% of the potassium acetate migrated from the cartridge into the catalyst in the course of 14 days. Replenishment of the catalyst with alkali metal acetate was repeated by renewing the alkali metal acetate cartridge. By this measure, the catalyst output again rose on the 60th day to 135 g. of vinyl acetate per liter of catalyst per hour and remained unchanged over a further period of 35 days.

The surprising effect of volatilization of alkali metal acetate added to a hot reactant gas stream containing acetic acid was demonstrated by the following Example.

EXAMPLE 8

Experiment A 1000 milliliter of a porous inert support consisting of aluminum oxide with an inner surface of <1 m.$^2$/g. were impregnated with an aqueous sodium acetate solution in such a manner that one liter of the support contained 30 grams of sodium acetate. 650 milliliters of this impregnated support were introduced into a tube of 25 mm. inner diameter and 2 meters length. Over this sodium acetate containing support there was passed ethylene at a super atmospheric pressure of 8 atmospheres and at a temperature of 180° C., at the rate set forth in Table 1, below. The gas leaving the tube was then analyzed. The result is shown in Table 1.

Experiment B

Experiment A was repeated with a different amount of ethylene, as set forth in Table 1.

Experiment C

Experiment A was repeated except that, instead of ethylene alone, a mixture of ethylene and acetic acid was passed over fresh support in the manner described in Experiment A, at the rates stated in Table 1. The gas leaving the tube was analyzed as in Experiment A. The results are set forth in Table 1.

TABLE 1

| Experiment | Gas rate in moles/hour | | | Mole percent acetic acid in gas | Mole-p.p.m.* sodium acetate in gas |
|---|---|---|---|---|---|
| | Ethylene | Acetic acid | Total | | |
| A | 40 | 0 | 40 | 0 | 1 |
| B | 50 | 0 | 50 | 0 | 1 |
| C | 40 | 10 | 50 | 20 | 35 |

*1 mole-p.p.m.=0.0001 mole percent.

The above experiments A, B and C demonstrate that the sodium acetate is not volatilized if only ethylene gas is conducted over the support containing sodium acetate. If however, an ethylene/acetic acid gas stream is used, the sodium acetate volatilizes so that the resulting gas stream contains gaseous sodium acetate.

While applicants do not rely on any particular theory for the success of their invention, their experiments have shown that a mere mechanical addition of alkali metal acetate or compound to a catalyst which has been used for extended periods, e.g., one month or so, and has thereby become greatly less effective, does not restore catalytic activity to the level achieved by fresh catalyst. Contrariwise, proceeding in accordance with this invention, results in maintaining catalytic activity at substantially fresh-catalyst levels. Accordingly, it is evident that effects other than mechanical replenishment of the alkali metal acetate are involved in the instant invention.

It will be understood that the foregoing specification and examples are illustrative and not limitative of the present invention in that many other embodiments of the invention will suggest themselves to those skilled in the art.

What is claimed is:

1. In a process for the continuous production of vinyl acetate by reacting ethylene with acetic acid and oxygen in the gas phase at elevated temperature in a reactor in the presence of a catalyst consisting essentially of palladium metal and an alkali metal acetate, and optionally a noble metal selected from the group consisting of gold, iridium, ruthenium, platinum, rhodium and osmium, the improvement which comprises introducing into a gaseous reactant stream containing acetic acid or into the reactor gaseous alkali metal acetate or a compound forming gaseous alkali metal acetate under the reaction conditions, in amount sufficient to prolong catalyst life.

2. Improvement as claimed in claim 1 wherein said alkali metal acetate or compound is introduced in amount of from 2 to 200 parts per million, by weight, based on the acetic acid introduced into the reactor.

3. Improvement as claimed in claim 2 wherein said amount is 5 to 50 parts per million, by weight.

4. Improvement as claimed in claim 1 wherein said alkali metal acetate or compound is introduced in amounts corresponding to 80 to 100% of the saturation value of the alkali metal acetate in the reactor space.

5. Improvement as claimed in claim 1 wherein said alkali metal acetate or compound is sodium acetate.

6. Improvement as claimed in claim 1 wherein said alkali metal acetate or compound is potassium acetate.

7. Improvement as claimed in claim 1 wherein said elevated temperature is from about 50 to about 250° C.

8. Improvement as claimed in claim 7 wherein the reaction pressure is from about normal pressure to about 200 atmospheres (gauge).

9. Improvement as claimed in claim 1 wherein said catalyst contains gold as said noble metal.

10. Improvement as claimed in claim 1 wherein said catalyst consists of palladium metal, gold metal and sodium acetate and the introduced alkali metal acetate or compound is sodium acetate.

11. Improvement as claimed in claim 1 wherein said catalyst consists of palladium metal, gold metal and potassium acetate, and the introduced alkali metal acetate or compound is potassium acetate.

12. Improvement as claimed in claim 1 wherein said alkali metal acetate or compound is introduced to an ethylene gas stream containing acetic acid.

13. Improvement as claimed in claim 1 wherein said alkali metal acetate or compound is introduced into a reactant gas stream containing primarily ethylene and acetic acid at conditions of temperature and pressure substantially the same as the conditions of temperature and pressure in the reactor.

14. Improvement as claimed in claim 13 wherein said acetic acid/ethylene gas stream is at a temperature above about 120° C.

15. Improvement as claimed in claim 14 wherein the acetic acid/ethylene gas stream is at a pressure of from 1 to 8 atmospheres (gauge).

16. Improvement as claimed in claim 1 wherein said introduced alkali metal acetate or compound is introduced by dissolving it in liquid acetic acid and then vaporizing the resulting solution.

17. Improvement as claimed in claim 1 wherein said alkali metal acetate or compound is introduced into the reaction space.

18. Improvement as claimed in claim 1 wherein said introduced alkali metal acetate or compound is introduced by passing a reactant stream through a solution of the alkali metal acetate or compound, in the presence of acetic acid.

19. Improvement as claimed in claim 18 wherein the alkali metal acetate or compound is introduced in the form of an aqueous or acetic acid solution.

20. Improvement as claimed in claim 1 wherein said catalyst is on a carrier support.

21. Improvement as claimed in claim 20 wherein said carrier support is silicic acid or a silicate.

22. Improvement as claimed in claim 1 wherein said introduced alkali metal acetate or compound is introduced by passing at least one of the reactants at an elevated temperature through a layer of solid bodies, impregnated with said alkali metal acetate or compound, in the presence of acetic acid.

23. Improvement as claimed in claim 1 wherein said process is a long term continuous process operated continuously for a period of greater than 6 months.

References Cited

UNITED STATES PATENTS

| 3,275,680 | 9/1966 | Holzrichter et al. | 260—497 A |
| 3,658,888 | 4/1972 | Hornig et al. | 260—497 A |

FOREIGN PATENTS

| 1,017,938 | 1/1966 | Great Britain | 260—497 A |
| 747,415 | 11/1966 | Canada | 260—497 A |

LORRAINE A. WEINBERGER, Primary Examiner

R. D. KELLY, Assistant Examiner

U.S. Cl. X.R.

252—430